(12) United States Patent
Morales Álvarez et al.

(10) Patent No.: US 10,060,349 B2
(45) Date of Patent: Aug. 28, 2018

(54) SYSTEM AND METHOD FOR COUPLING COMPONENTS OF A TURBINE SYSTEM WITH CABLES

(71) Applicant: General Electric Company, Schenectady, NY (US)

(72) Inventors: Sergio Morales Álvarez, Querétaro (MX); Waldemar Alejandro Perales Muñoz, Querétaro (MX); Randall John Kleen, Channelview, TX (US)

(73) Assignee: General Electric Company, Schenectady, NY (US)

( * ) Notice: Subject to any disclaimer, the term of this patent is extended or adjusted under 35 U.S.C. 154(b) by 245 days.

(21) Appl. No.: 14/935,302

(22) Filed: Nov. 6, 2015

(65) Prior Publication Data
US 2017/0133909 A1    May 11, 2017

(51) Int. Cl.
*H02K 7/18* (2006.01)
*F02C 7/00* (2006.01)
*F02C 7/20* (2006.01)
*F02C 7/32* (2006.01)

(52) U.S. Cl.
CPC .................. *F02C 7/00* (2013.01); *F02C 7/20* (2013.01); *F02C 7/32* (2013.01)

(58) Field of Classification Search
CPC .................. F02C 7/32; F02C 7/00; F02C 7/20
USPC ....................... 290/7; 174/50.52, 59; 439/535
See application file for complete search history.

(56) References Cited

U.S. PATENT DOCUMENTS

| | | | | |
|---|---|---|---|---|
| 3,453,443 | A * | 7/1969 | Stoeckly | F02C 6/02 290/2 |
| 5,384,430 | A * | 1/1995 | Anthony | H01B 7/046 174/102 R |
| 5,665,939 | A * | 9/1997 | Jorgensen | H02K 5/225 174/50.52 |
| 5,902,962 | A * | 5/1999 | Gazdzinski | G01M 11/30 174/113 R |
| 6,298,917 | B1 * | 10/2001 | Kobylinski | E21B 17/20 166/105 |
| 2009/0134625 | A1 * | 5/2009 | Altenschulte | H01B 7/14 290/44 |
| 2011/0155458 | A1 * | 6/2011 | Kato | B60R 16/0215 174/74 R |
| 2013/0125561 | A1 * | 5/2013 | Schwarz | F02C 6/00 60/802 |

(Continued)

*Primary Examiner* — Sean Gugger
(74) *Attorney, Agent, or Firm* — Fletcher Yoder, P.C.

(57) ABSTRACT

A system includes a turbine having one or more turbine stages and a turbine support system, which may include a turbine support component, a motor coupled to the turbine support component, an auxiliary component, and a first cable interface coupled to the motor and the auxiliary component, and a motor control system. The motor control system includes a controller, a power source coupled to the controller, a second cable interface coupled to the power source, and a cable having a first plug removably coupled to the first cable interface and a second plug removably coupled to the second cable interface. The cable includes a plurality of insulated conductors. The first plug and the first cable interface include a first set of mating motor connectors and mating auxiliary connectors, and the second plug and the second cable interface include a second set of mating motor connectors and mating auxiliary connectors.

20 Claims, 4 Drawing Sheets

(56) References Cited

U.S. PATENT DOCUMENTS

| | | | | |
|---|---|---|---|---|
| 2013/0206473 A1* | 8/2013 | Gottschlich | ............ | H01R 4/5025 |
| | | | | 174/75 R |
| 2015/0027712 A1* | 1/2015 | Vicknair | ............... | E21B 43/162 |
| | | | | 166/305.1 |
| 2015/0084346 A1* | 3/2015 | Tomigashi | .............. | F01K 13/02 |
| | | | | 290/40 R |

* cited by examiner

FIG. 1

FIG. 2 ers on a multi-trailer assembly. Advantageously, the various cables of the cable connection system and the corresponding components may be color coded to help facilitate proper cable connections during setup of the mobile turbine generator system on-site.

SYSTEM AND METHOD FOR COUPLING COMPONENTS OF A TURBINE SYSTEM WITH CABLES

BACKGROUND

The subject matter disclosed herein relates to electrical cable connections in mobile turbine generator systems.

Mobile turbine generator systems may be delivered to a site in a partially assembled state of components, followed by on-site setup of various components. The systems may employ a variety of bulky electrical cables. Unfortunately, the number and size of the cables may complicate the on-site setup. For example, the potential for mismatched cables may increase as the number of cables increases, thus increasing the amount of time to properly assemble the cables with various components of the mobile turbine generation system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine having one or more turbine stages and a turbine support system. The turbine support system may include a turbine support component, a motor coupled to the turbine support component, an auxiliary component, and a first cable interface coupled to the motor and the auxiliary component, and a motor control system. The motor control system may include a controller, a power source coupled to the controller, a second cable interface coupled to the power source, and a cable having a first plug removably coupled to the first cable interface and a second plug removably coupled to the second cable interface. The cable may include a plurality of conductors that are insulated from one another. The first plug and the first cable interface may include a first set of mating motor connectors and a first set of mating auxiliary connectors, and the second plug and the second cable interface may include a second set of mating motor connectors and a second set of mating auxiliary connectors.

In a second embodiment, a system includes a turbine support system, including a turbine support component, a motor coupled to the turbine support component, an auxiliary component, and a first cable interface coupled to the motor and the auxiliary component. The first cable interface may be configured to removably couple with a first plug of a cable. The first plug and the first cable interface may include a first set of mating motor connectors and a first set of mating auxiliary connectors.

In a third embodiment, a system includes a cable having a first plug configured to removably couple to a first cable interface of a turbine support system and a second plug configured to removably couple to a second cable interface of a motor control system. The cable comprises a plurality of conductors that are insulated from one another, the first plug and the first cable interface may include a first set of mating motor connectors and a first set of mating auxiliary connectors. The second plug and the second cable interface may include a second set of mating motor connectors and a second set of mating auxiliary connectors.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide a cable connection system for a plurality of quick disconnect cables (e.g., electrical power and data communication cables) disposed between a turbine support system and a motor control system having one or more cable interfaces. In particular, the disclosed embodiments may enable quick setup on-site for a mobile turbine system, which may induce a gas turbine driven generator and a control system that includes a motor control system. The cable surrounds a plurality of conductors that are insulated from one another. The cable may have a first plug that may be removably coupled to a first cable interface via a first plurality of connectors and a second plug that may be removably coupled to a second cable interface via a second plurality of connectors. The first plug and the first cable interface may include a first set of mating motor connectors and a first set of mating auxiliary connectors, and the second plug and the second cable interface may include a second set of mating motor connectors and a second set of mating auxiliary connectors. A turbine support system may be coupled to a motor control system by the cable. The cable may couple via a first cable interface to the turbine support system, and the cable may couple via a second cable interface to the motor control system. The turbine support system may include a turbine support component, a motor, an auxiliary component, and a plurality of sensors. Each of the turbine support component, the motor, the auxiliary component, and the plurality of sensors may be coupled to the first cable interface via a composite plug (e.g., a first plug). The motor control system may control the turbine support system via a controller. The motor control system may include a power source in addition to the controller. The controller and the power source may be coupled to a second cable interface via another composite plug (e.g., a second plug).

In some embodiments, the first plug may be selectively locked to the first cable interface with a first set of mating lock features, and the second plug may be selectively locked to the second cable interface with a second set of mating lock features. The first set of mating lock features may include a first pair of threaded couplings, and the second set of mating lock features may include a second pair of threaded couplings. The first and the second sets of mating motor connectors and the first and the second sets of mating auxiliary connectors may include mating male and female connectors that couple together by engaging one another in an axial direction. In some embodiments, the first and the second sets of the mating motor connectors may include high voltage connectors (e.g., 400-480 Volts (V) or higher), and the first and the second sets of the mating auxiliary connectors may include low voltage connectors (e.g., 100-120 V or lesser). The cable may be supported by a support structure that may include a plurality of supporting brackets. For example, the cable may be selectively supported by a first support bracket adjacent the first connection between the first plug and the first cable interface. Similarly, the cable may be selectively supported by a second support bracket adjacent the second connection between the second plug and the second cable interface, or a combination thereof. As described below, the quick disconnect cables may reduce the possibility of mismatched wiring connections by utilizing fewer cables for the motor driven machines. The reduction in the number of cables may also reduce the weight and the amount of time required for proper assembly that is associated with a greater number of cables.

Figure 1:
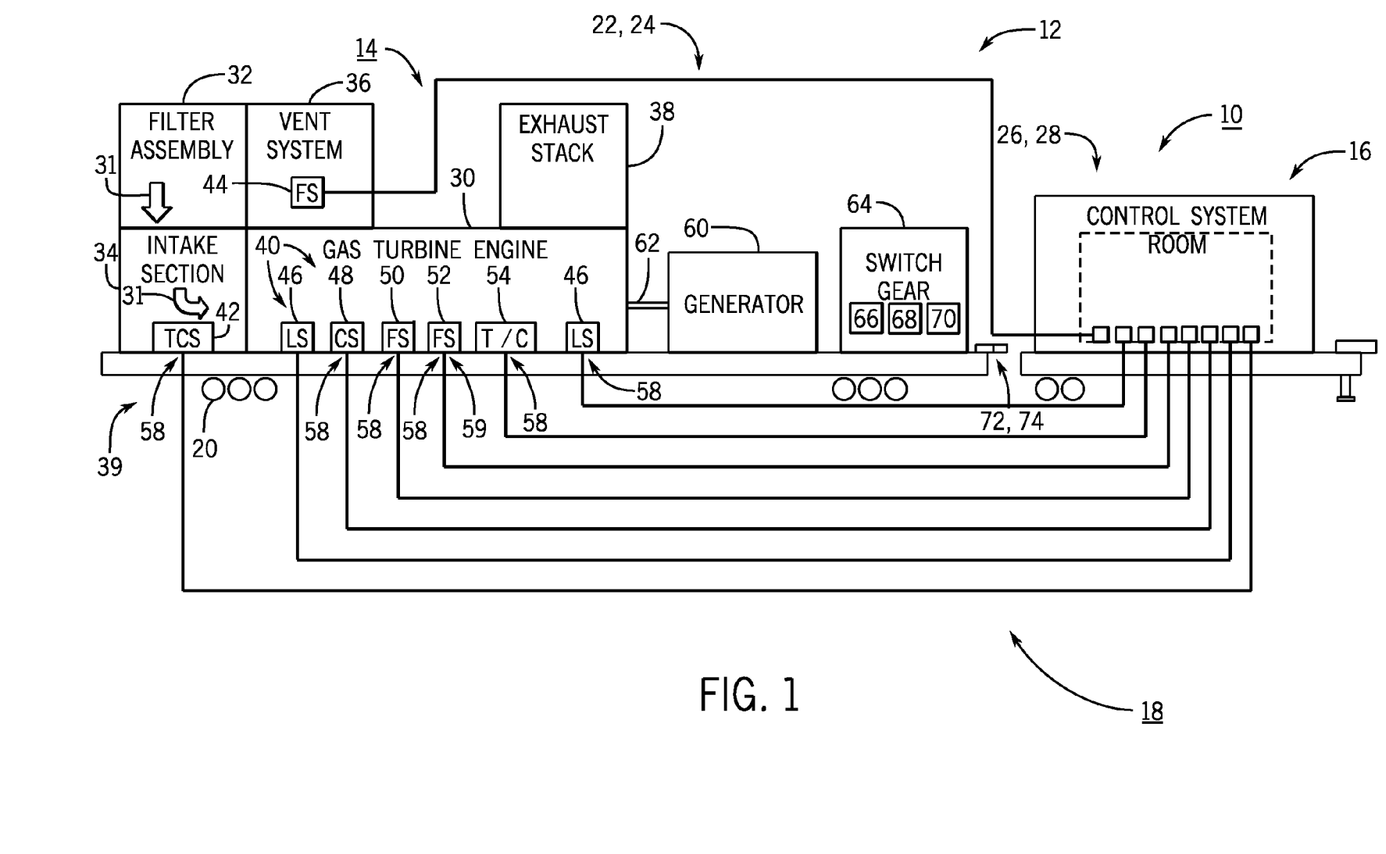
FIG. 1 illustrates a schematic diagram of an embodiment of a mobile turbine system mounted on a multi-trailer assembly, illustrating a gas turbine system coupled to a control system via a cable connection system.

Turning now to the drawings, FIG. 1 illustrates schematic diagram of an embodiment of a mobile turbine system 10 mounted on a multi-trailer assembly 12. The mobile turbine system 10 may include a gas turbine system 14 and a control system 16 coupled together via a cable connection system 18. As discussed in detail below, the cable connection system 18 enables a quick and reliable connection of components between the gas turbine system 14 and the control system 16 via cables and connectors having multiple electrical connectors (e.g., low, medium, and/or high voltage, data communication, etc.) with features to help match connections. The mobile turbine system 10 may enables power generation on site without commissioning and constructing a traditional power plant. For example, the mobile turbine system 10 may be utilized in settings such as an industrial operation or emergency site (e.g., a blackout, brownout, a natural disaster such as a flood, hurricane, or earthquakes, etc.). The mobile turbine system 10 may include a plurality of wheels 20 disposed beneath the multi-trailer assembly 12 and may include a modular design that enables faster installation on site. The mobile turbine system 10 may be mounted on the mobile, multi-trailer assembly 12 and transported (e.g., via sea, land, air) such that the mobile turbine system 10 can be deployed quickly once it arrives to its designated location to provide power. The multi-trailer assembly 12 may include a first trailer 22 (e.g., a power generation trailer 24) and a second trailer 26 (e.g., an auxiliary trailer 28). The power generation trailer 24 may include a gas turbine system 14 mounted to it.

The gas turbine system 14 may include a load 29 driven by a gas turbine engine 30 (e.g., a GE LM 2500+ gas turbine), a filter assembly 32, an air intake section 34, a ventilation system 36, and an exhaust stack 38. As discussed in further detail below, the gas turbine system 14 includes a turbine support system 39 having a plurality of turbine support components 40, which couple with the control system 16 via the cable connection system 18. The intake section 34 may include a support component 40, such as a thermal control system 42 configured to exchange heat between an intake air flow 31 and a thermal fluid flow 33 (see FIG. 2). The ventilation system 36 may include a support component 40, such as a motor driven fan system 44. Other support components 40 may be utilized in the gas turbine engine 30. For example, with reference to FIGS. 1 and 2, the gas turbine engine 30 may include a plurality of support components 40 that support the operation of gas turbine engine 30, such as a lubricant system 46 configured to circulate a lubricant flow 45, a coolant system 48 configured to transfer heat between a compressed air flow 47 and a coolant flow 49 (e.g., between downstream and upstream stages of a compressor 90), a fuel system 50 configured to supply a fuel flow 51 (e.g., liquid or gaseous fuel) into one or more combustors 85, a fluid injection system 52 configured to inject one or more fluid flows 53 (e.g., water, steam, inert gas such as nitrogen, recirculated exhaust gas, or any combination thereof) into the combustor 164, and a thermal/clearance control system 54 configured to control a clearance between turbine blades and turbine shrouds (e.g., via heat exchange between first and second fluid flows 55, 57). In some embodiments, there may be one or more of the same support components 40 in the system. For example, the gas turbine engine 30 may include one or more lubricant systems 46 to lubricate moving parts of the engine 30 and/or a generator 60.

Each of the support components 40 may include a motor 56 (e.g., electric motor, drive, actuator, or other electricity power unit) coupled to the control system 16 via a plurality of quick connection points or couplings 58. The cable connection system 18 is configured to help quickly setup the mobile turbine system 10 upon reaching a new site, and particularly helps in reducing the number of connections due to bundling of multiple conductors (e.g., low, medium, and high voltage conductors; data communication conductors, etc.) in fewer cables and further helps in providing quick connections via the quick connection points 58. As discussed in detail below, each quick connection point 58 may include a plug in receptacle coupling 59, which may be engaged and disengaged by a straight axial movement, a rotational movement, or a combination thereof. Each plug in receptacle coupling 59 may include a first conductor coupling set (e.g., a low voltage set), a second conductor coupling set (e.g., a medium voltage set), and a third conductor coupling set (e.g., a high voltage set), wherein each set may include 1, 2, 3, 4, 5, 6 or more conductor couplings. For example, each set may include first, second, and third couplings.

The load 29 of the mobile turbine system 10 may include a generator 60 to generate power for the mobile turbine system 10. The gas turbine engine 30 may be coupled to the generator 60 via a common shaft 62 and may drive the generator 60, which may be mounted to the power generation trailer 24. The mobile turbine system 10 may also include a switch gear box 64. The switch gear box 64 may include electrical disconnect switches 66, fuses 68, circuit breakers 70 and so forth. The power generation trailer 24 may be coupled the auxiliary trailer 28 by a docking coupling or pin 72 (e.g., trailer hitch 74). In some embodiments, the gas turbine engine 30 may be mounted to the power generation trailer 24 such that it is open to the atmosphere or enclosed in an enclosure 76.

Figure 2:
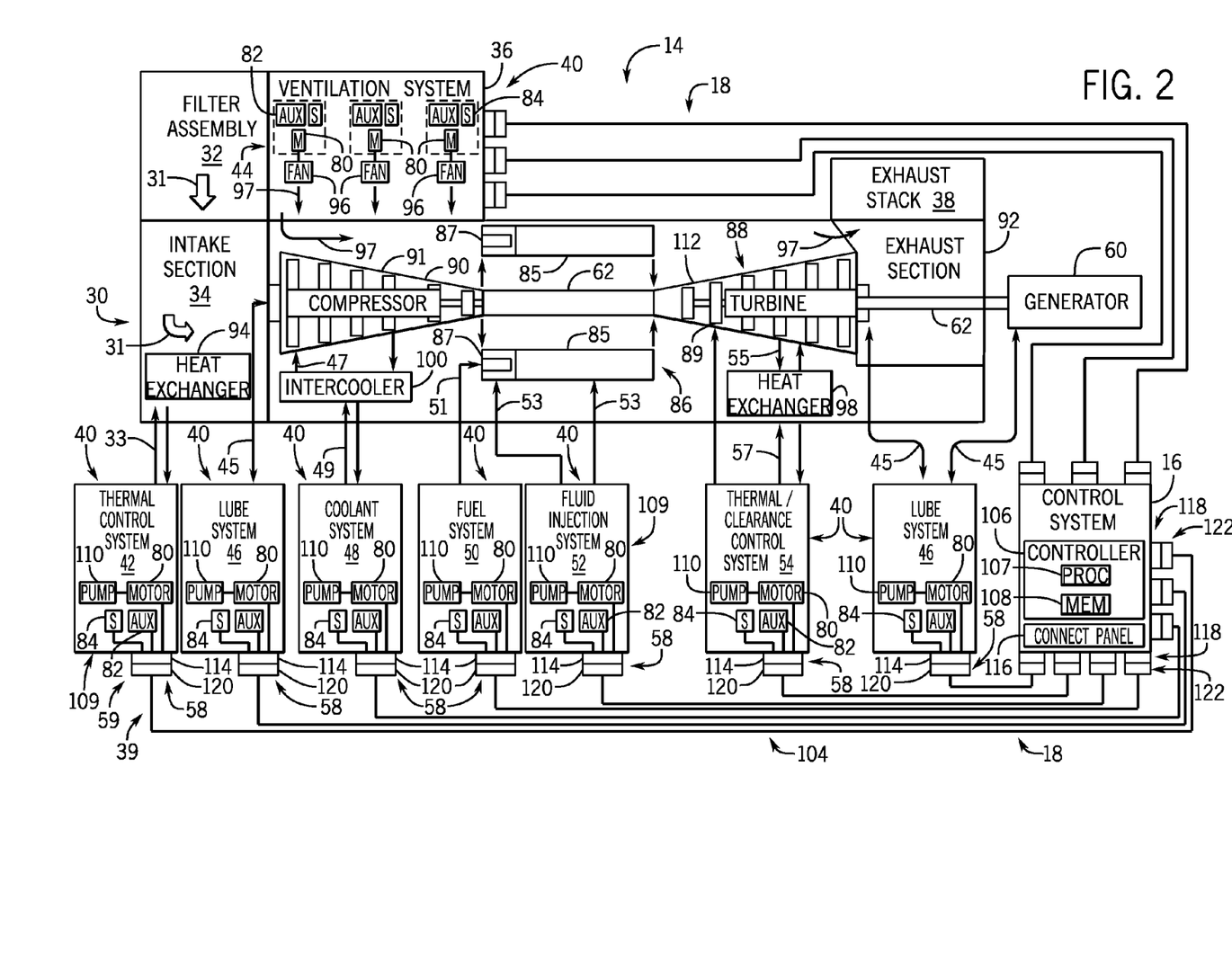
FIG. 2 illustrates a schematic diagram of an embodiment of the gas turbine system having a plurality of turbine support systems coupled to the control system via the cable connection system.

FIG. 2 illustrates a schematic diagram of an embodiment of the gas turbine system 14 coupled to the control system 16 via the cable connection system 18. The gas turbine system 14 has the gas turbine engine 30 with a combustion system 86, a turbine 88 having turbine blades 89 driven by hot combustion gases from the combustion system 86, a compressor 90 driven by the turbine 88 to rotate compressor blades 91 via the common shaft 62, and an exhaust section 92 configured to discharge exhaust gas via the exhaust stack 38. The gas turbine system 14 may include the filter assembly 32 and the air intake section 34 configured to filter and intake the air flow 31 into the compressor 90, and the ventilation system 36 configured to ventilate the space surrounding the gas turbine engine 30.

As described above, the gas turbine engine 30 may include the plurality of support components 40, such as the thermal control system 42, the motor driven fan system 44, the lubricant system 46, the coolant system 48, the fuel system 50, the fluid injection system 52, and the thermal/clearance control system 54. Each of these support components 40 helps support operation of the gas turbine engine 30, and is configured to interface with the control system 16 via the cable connection system 18 (e.g., electrical/communication lines or cables 104) to improve on-site setup of the mobile turbine system 10. The cables 104 may be electrical cables having a plurality of sets of conductors having different functions, dedicated to different equipment, different voltage ratings, or different purposes (e.g., power, sensor feedback, control signals, etc.). The control system 16 includes a controller 106 having a processor 107 and memory 108, wherein the memory 108 stores software instructions or code that is executable by the processor 107 to control various aspects of the gas turbine system 14, including the gas turbine engine 30 and the support components 40. For example, the controller 106 is configured to receive and process feedback from the sensors 84 through the cables 104, send control signals through the cables 104, and send power through the cables 104 (e.g., low, medium, and/or high voltage power).

In the illustrated embodiment, each of the support components 40 may include a drive, actuator, or motor 80, an auxiliary unit, component, or equipment 82, and one or more sensors 84, and thus the cables 104 may include one or more conductors for each of these components 80, 82, and 84. The motor 80 may be an electric motor, such as a direct current (DC) electric motor and/or alternating current (AC) electric motor operating on one or more phases (e.g., single, two, or three phases). The auxiliary equipment 82 may include motor support equipment, such as a lubricant system, a cooling system, a heating system, or any combination thereof, used to support operation of the motor 80. For example, the auxiliary equipment 82 (e.g., cooling or heating system) may help heat up the motor 80 for startup in cold weather, and cool the motor 80 in hot weather and/or during operation. The auxiliary equipment 82 (e.g., lubricant system) may circulate a lubricant through the motor 80 to improve operation of the motor 80. The sensors 84 may include one or more sensors configured to monitor temperature, pressure, flow rate, vibration, stoppage, environmental conditions (e.g., humidity or temperature), or any combination thereof.

The air intake section 34 may include a heat exchanger 94 configured to transfer heat between the air intake flow 31 and the thermal fluid flow 33 (e.g., a coolant or heated fluid), which is controlled by the thermal control system 42 to control the temperature of the intake air flow 31 into the compressor 90 of the gas turbine engine 30. As illustrated, the thermal control system 42 includes a motor driven pump system 109 having a pump 110 driven by a motor 80, auxiliary equipment 82, and one or more sensors 84. The pump 110 is configured to circulate the thermal fluid flow 33 to and from the heat exchanger 94. The sensors 84 may be configured to monitor the temperature and flow rate of the thermal fluid flow 33, the air intake flow 31, or any combination thereof. The sensors 84 also may be configured to monitor the temperature, vibration, or other operational characteristics of the motor 80.

The motor driven fan system 44 of the ventilation system 36 may include a plurality of fans 96 driven by a plurality of the motors 80, thereby forcing a ventilation air flow 97 around the gas turbine engine 30 and/or through an enclosure 76 surrounding the engine 30. The air flow 97 helps to cool the gas turbine engine 30 and purge any undesirable contaminants (e.g., fuel, exhaust gas, etc.) from the enclosure 76. The motor driven fan system 44 also includes the auxiliary equipment 82 as described above, and one or more sensors 84. The sensors 84 may be configured to monitor the temperature and flow rate of the ventilation air flow 97, the temperature inside the enclosure 76, the temperature, vibration, and operational characteristics of the motor 80, or any combination thereof.

The gas turbine engine 30 may include one or more lubricant systems 46 to circulate a lubricant 45 to and from various rotating parts, such as the turbine 88, the compressor 90, the generator 60, or any combination thereof. In certain embodiments, the turbine subsystems (e.g., 60, 88, and 90) may share a common lubricant system 46 or may have a dedicated lubricant system 46. In the illustrated embodiment, the lubricant system 46 includes a motor driven pump system 109 having a pump 110 driven by a motor 80, auxiliary equipment 82, and one or more sensors 84. The pump 110 is configured to circulate the lubricant 45 to and from the turbine subsystems (e.g., 60, 88, and 90). The sensors 84 may be configured to monitor the temperature, flow rate, viscosity, or contamination of the lubricant 45.

The sensors 84 also may be configured to monitor the temperature, vibration, or other operational characteristics of the motor 80.

In the illustrated embodiment, the compressor 90 has an intercooler 100 (e.g., heat exchanger) disposed between downstream and upstream stages of compression and/or at specific stages of compression, such that the compressed air 47 can be cooled to improve the efficiency of compression by the compressor 90. Accordingly, the coolant system 48 may control circulation of a coolant 49 through the intercooler 100, thereby controlling the heat transfer away from the compressed air 47. The coolant 49 may include a liquid or gas coolant, such as air or water. As illustrated, the coolant system 48 includes a motor driven pump system 109 having a pump 110 driven by a motor 80, auxiliary equipment 82, and one or more sensors 84. The pump 110 is configured to circulate the coolant 49 to and from the intercooler 100. The sensors 84 may be configured to monitor the temperature and flow rate of the coolant 49, the compressed air flow 47, or any combination thereof. The sensors 84 also may be configured to monitor the temperature, vibration, or other operational characteristics of the motor 80.

The gas turbine engine 30 may include one or more fuel systems 50 to supply one or more fuel flows 51 to the combustion system 86, which may include one or more combustors 85 each having one or more fuel nozzles 87. In certain embodiments, the fuel system 50 may include a first fuel system, a second fuel system, a third fuel system, or any number of additional fuel systems. The fuel systems 50 may include primary and secondary fuel systems, liquid and gaseous fuel systems, startup and steady state fuel systems, or any combination thereof. In the illustrated embodiment, the fuel system 50 includes a motor driven pump system 109 having a pump 110 driven by a motor 80, auxiliary equipment 82, and one or more sensors 84. The pump 110 is configured to supply the fuel 51 to each of the combustors 85 and/or fuel nozzles 87. The sensors 84 may be configured to monitor the fuel characteristics (e.g., energy value, viscosity, temperature, flow rate, pressure, etc.), the combustion characteristic in the combustor 85, pollutant emissions (e.g., nitrogen oxides, sulfur oxides, carbon oxides, etc.), the power output by the turbine engine 30, or any combination thereof. The sensors 84 also may be configured to monitor the temperature, vibration, or other operational characteristics of the motor 80.

The gas turbine engine 30 may include one or more fluid injection systems 52 to supply one or more fluid flows 53 to the combustion system 86, e.g., to the one or more combustors 85 and/or to the one or more fuel nozzles 87. In certain embodiments, the fluid injection system 52 may include a first fluid system, a second fluid system, a third fluid system, or any number of additional fuel systems. The fluid injection systems 52 may include a steam injection system to inject steam 53, a water injection system to inject water 53, an inert gas injection system to inject an inert gas 53 (e.g., nitrogen), or any combination thereof. In the illustrated embodiment, the fluid injection system 52 includes a motor driven pump system 109 having a pump 110 driven by a motor 80, auxiliary equipment 82, and one or more sensors 84. The pump 110 is configured to supply the fluid 53 to each of the combustors 85 and/or fuel nozzles 87. The sensors 84 may be configured to monitor the fluid characteristics (e.g., temperature, flow rate, pressure, etc.), the combustion characteristic in the combustor 85, pollutant emissions (e.g., nitrogen oxides, sulfur oxides, carbon oxides, etc.), the power output by the turbine engine 30, or any combination thereof. The sensors 84 also may be configured to monitor the temperature, vibration, or other operational characteristics of the motor 80.

In the illustrated embodiment, the gas turbine engine 30 may utilize a heat exchanger 98 configured to exchange heat between first and second fluids 55, 57 via control by the thermal/clearance control system 54, thereby enabling control of a clearance between turbine blades 89 and turbine shrouds or casing 112 in the turbine 88. For example, the first fluid 55 may include an airflow, an exhaust gas flow, or another fluid flow (e.g., gas or liquid) through a cavity in the turbine 88, thereby controlling thermal expansion or contraction of the shrouds 112 and thus clearance between the shrouds 112 and the blades 89. The second fluid 57 may include a liquid or gas thermal fluid, such as water, which may be heated or cooled to vary the temperature of the first fluid 55. In some embodiments, the thermal/clearance control system 54 may route a fluid (e.g., gas or liquid 57) directly to the turbine 88 without an intermediate heat exchanger 98, thereby directly providing fluid 57 to help control the temperature and/or clearance in the turbine 88. As illustrated, the thermal/clearance control system 54 includes a motor driven pump system 109 having a pump 110 driven by a motor 80, auxiliary equipment 82, and one or more sensors 84. The pump 110 is configured to circulate the fluid 57 to and from the heat exchanger 98 and/or the turbine 88. The sensors 84 may be configured to monitor the temperature and flow rate of the fluid 57, the fluid 55, a fluid in the turbine 88, or any combination thereof. The sensors 84 also may be configured to monitor the clearance, rub conditions, vibration, or other indicators pertaining to clearance between the turbine blades 89 and shrouds 112. The sensors 84 also may be configured to monitor the temperature, vibration, or other operational characteristics of the motor 80.

Each of the support components 40 of the turbine support system 39 has its respective motors 80, auxiliary equipment 82, and sensors 84 coupled to a quick connection point 58, which includes a first cable interface 114 of the plug in receptacle coupling 59. Similarly, the control system 16 includes a control and/or connect panel 116 coupled to one or more controllers 106 (e.g., a motor control system or controller, a turbine control system or controller, a generator control system or controller, etc.), wherein the connect panel 116 has a plurality of second cable interfaces 118. The second cable interfaces 118 are configured to match and couple with the corresponding first cable interfaces 114 via respective cables 104 of the cable connection system 18. In particular, each cable 104 includes first and second plugs 120 and 122 at opposite first and second ends of the cable 104, wherein the first plug 120 is configured to couple (e.g., quick connect and disconnect) with the first cable interface 114, while the second plug 122 is configured to couple (e.g., quick connect and disconnect) with the second cable interface 118. As discussed in detail below, each cable 104, first cable interface 114, second cable interface 118, first plug 120, and second plug 122 includes a plurality of conductors and connectors configured to transfer electrical power, control signals, sensor feedback, other data and communications, or any combination thereof. For example, the plurality of conductors and connectors may include a first conductor coupling set (e.g., a motor connector set), a second conductor coupling set (e.g., an auxiliary equipment connector set), and a third conductor coupling set (e.g., a sensor connector set), wherein each set may include 1, 2, 3, 4, 5, 6 or more conductor couplings. By further example, the plurality of conductors and connectors may include a first conductor coupling set (e.g., a high voltage set), a second conductor coupling set (e.g., a medium voltage set), and a third conductor coupling set (e.g., a low voltage set), wherein each set may include 1, 2, 3, 4, 5, 6 or more conductor couplings. For example, one or more sets may be a three-phase electrical set (e.g., motor connector set) having first, second, and third couplings corresponding to first, second, and third phases, such as for a three-phase alternating current (AC) motor 80. Furthermore, the auxiliary equipment connector set and the sensor set may be integrated into one set (e.g., auxiliary set), which may be of a lower voltage than the motor connector set. By integrating multiple conductor sets into a single cable 104 and corresponding interfaces 114, 118 and plugs 120, 122, the cable connection system 118 may reduce the number of cable connections by ½, ⅓, or 1/N, depending on the number of conductor sets (N) integrated into each cable 104. As a result, the on-site setup time and complexity may also decrease by a similar amount, e.g., 1/N, thereby substantially speeding up the process of providing electrical power by the mobile turbine system 10.

As described above, the mobile turbine system 10 has the gas turbine engine 30 drivingly coupled to the load 29 (e.g., the generator 60), thereby generating electrical power to meet demands at various sites. In operation, the compressor 90 receives the intake air flow 31 through the filter assembly 32 (e.g., a plurality of filters) and the intake section 34, compresses the air flow 31 through one or more stages of compression (e.g., compressor blades 91), and delivers the compressed air to the combustion system 86 (e.g., one or more combustors 85 and fuel nozzles 87). The filter assembly 32 removes particulates, water, and other contaminants, while the heat exchanger 94 in the intake section 34 controls the temperature of the air flow 31 (e.g., increases or decreases temperature). The coolant system 48 helps to improve the efficiency of the compressor 90 by cooling the compressed air between compression stages. The combustion system 86 also receives one or more fuel flows 51 from the fuel system 50 and one or more fluid flows 53 from the fluid injection system 52 to facilitate combustion in one or more combustors 85. The fluid flows 53 may help to control the combustion temperature, reduce emissions, augment power, or any combination thereof. The combustion in the combustion system 86 generates hot combustion gases, which then flow into the turbine 88 and drive one or more turbine stages (e.g., turbine blades 89) prior to discharge through the exhaust section 92 (e.g., diffuser) and exhaust stack 38 (e.g., conduit, silencer, emissions control equipment). The driven turbine stages (e.g., blades 89) drive rotation of the shaft 62, which in turn drives rotation of the compressor 90 and the generator 60. The thermal/clearance control system 54 helps to control the temperature outside the working path of the hot combustion gases and helps to control the clearance between the turbine blades 89 and the turbine shrouds 112. The lube systems 46 also help to lubricate the various rotating components, including the compressor 90, the turbine 88, and the generator 60. The ventilation system 36 helps to control the surrounding temperature and purge gases (e.g., exhaust gas, fuel vapor, etc.) around the gas turbine engine 30, and may route this purged flow into the exhaust stack 38.

Figure 3:
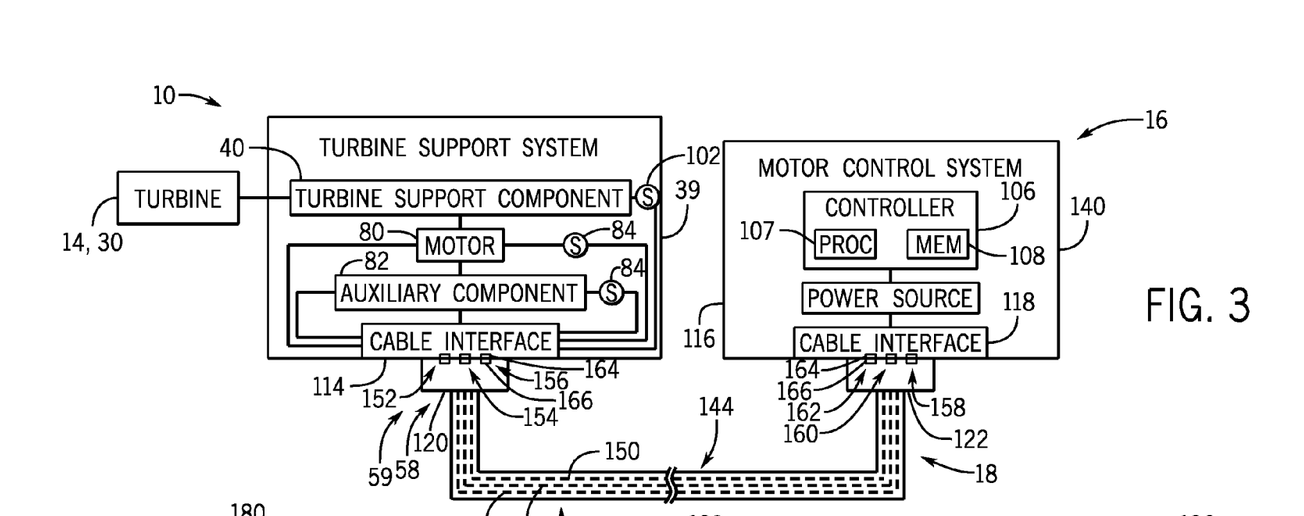
FIG. 3 illustrates a schematic diagram of an embodiment of a turbine support system coupled to a motor control system of the control system of FIGS. 1 and 2.

FIG. 3 illustrates schematic diagram of a gas turbine system 14 including a turbine support system 39 and a motor control system 140 of the control system 16. The motor control system 140, which is part of the control system 16, may include one or more motor controllers (e.g., controllers 106 having the processor 107 and the memory 108), a power source 142, and the connect panel 116 with one or more second cable interfaces 118. The motor control system 140 (e.g., controller 106) may store instructions on the memory 108 and execute the instructions on the processor 107 to control the motor 80 (e.g., speed, torque, etc.), control operation of the auxiliary equipment 82 (e.g., heat, cool, or lubricate the motor 80), and analyze feedback from the sensors 84.

As discussed above, the turbine support system 39 may include turbine support components 40, such as the thermal control system 42, the motor driven fan system 44, the lubricant systems 46, the coolant systems 48, the fuel systems 50, the fluid injection systems 52, the thermal/clearance control systems 54, pump systems, hardware, systems support, assembly components, and off-engine components, or any combination thereof. Each turbine support component 40 may include one or more motors 80, one or more auxiliary components or equipment 82, one or more sensors 84, and the first cable interface 114. The motors 80 may drive pumps, valves, flow controls, inlet guide vanes, clearance control structures, fans, or any combination thereof. In certain embodiments, the motors 80 may include direct current (DC) and/or alternating current (AC) motors 80 having one, two, or three phases, such as a three-phase AC motor 80. The motors 80 may be rated for between or greater than 25 to 400, 50 to 300, or 100 to 200 horsepower. The auxiliary equipment 82 may support the motors 80 and/or work in cooperation with the motors 80 to provide the desired functionality of the turbine support component 40. For example, the auxiliary equipment 82 may provide temperature control (e.g., heating or cooling), lubricant circulation, operational monitoring and/or control, or any combination thereof, for the motors 80. Accordingly, the auxiliary equipment 82 may include a heating system, a cooling system, a control system, a monitoring system, one or more of the sensors 84, or any combination thereof. The heating and/or cooling system may be used to control the temperature of the motor 80 and/or the turbine engine 30 during startup or steady state operation in cold or hot weather. The sensors 84 may sense temperature, pressure, vibration, fluid leakage, flow rate, environmental conditions (e.g., temperature, humidity, rain, snow, etc.), problems in the motor 80, or any combination thereof.

The cable connection system 18 includes the cable 104, the first plug 120 selectively coupled to the first cable interface 114 at the turbine support component 40, and the second plug 122 selectively coupled to the second cable interface 118 at the control system 16 (e.g., motor control system 140). In the illustrated embodiment, the cable connection system 18 includes a plurality of conductor sets, such as a motor conductor set, an auxiliary conductor set, and a sensor conductor set. The cable 104 comprises a plurality of conductors 144 that are insulated from one another (e.g., via an insulating material and/or an empty space), wherein the plurality of conductors 144 may include a set of motor conductors 146 (or other conductors), a set of auxiliary conductors 148 (or other conductors), and a set of sensor conductors 150 (or other conductors). In certain embodiments, the set of auxiliary conductors 148 may include all or part of the set of sensor conductors 150.

The first plug 120 and the first cable interface 114 may include a first set of mating motor connectors 152 (e.g., or other connectors), a first set of mating auxiliary connectors 154 (or other connectors), and/or a first set of mating sensor connectors 156 (or other connectors). In certain embodiments, the set of auxiliary connectors 154 may include all or part of the set of sensor connectors 156. Likewise, the second plug 122 and the second cable interface 118 may include a second set of mating motor connectors 158 (or other connectors), a second set of mating auxiliary connectors 160 (or other connectors), and/or a second set of mating sensor connectors 162 (or other connectors). In certain embodiments, the set of auxiliary connectors 160 may include all or part of the set of sensor connectors 162. Each set of connectors 152, 154, 156, 158, 160, and 162 may include a set of interface connectors 164 on the respective interface 114 or 118 and a set of plug connectors 166 on the respective plug 120 or 122. Each of the sets described above may include 1, 2, 3, 4, 5, 6, 7, 8, 9, 10, or more of the particular conductor or connector. Furthermore, the interface connectors 164 may include female connectors that mate with male connectors of the plug connectors 166, the interface connectors 164 may include male connectors that mate with female connectors of the plug connectors 166, or any combination thereof. Furthermore, each set of connectors 152, 154, 156, 158, 160, and 162 may include high voltage connectors, low voltage connectors rated at voltages below the high voltage connectors, and/or medium voltage connectors rated at voltages between the high and low voltage connectors. For example, the set of conductors 146, the first set of mating motor connectors 152, and the second set of mating motor connectors 158 may be sized and rated for high voltage, and may include a single phase set, a two phase set, or a three-phase set for the motor 80 (e.g., only one N-phase set, wherein N is 1, 2, or 3). By further example, the set of conductors 148, the first set of mating auxiliary connectors 154, and the second set of mating auxiliary connectors 160 may be sized and rated for medium or low voltage. By further example, the set of conductors 150, the first set of mating sensor connectors 156, and the second set of mating sensor connectors 162 may be sized and rated for low voltage.

In certain embodiments, the high voltage may be greater than or equal to approximately 200, 300, or 400 volts, such as between 400 to 480 volts. The low voltage may be less than or equal to approximately 10, 20, 30, 40, 50, 60, 70, 80, 90, 100, 110, or 120 volts. The medium voltage may be between the high and low voltage. In certain embodiments, the motor 80 may operate with a high voltage of between 400 to 480 volts, the auxiliary equipment 82 may operate with a low or medium voltage of 100 to 120 volts, and the sensors 84 may operate with an equal or lesser voltage than the auxiliary equipment 82.

Figure 4:
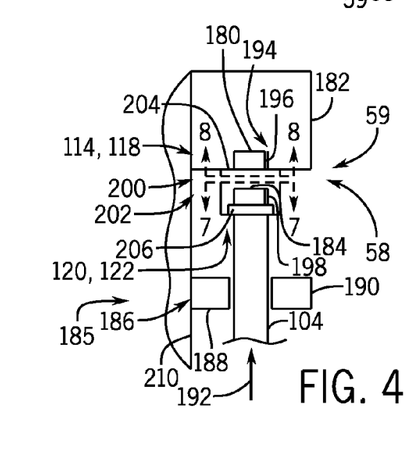
FIG. 4 is a partial exploded side view of an embodiment of a plug receptacle and a plug of the cable connection system of FIGS. 1-3, illustrating the plug being inserted into the plug receptacle and a bracket support partially disposed around a cable having the plug.
Figure 5:
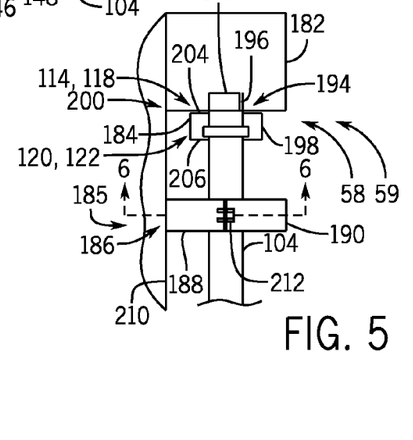
FIG. 5 is a partial side view of an embodiment of the plug receptacle and the plug of the cable connection system of FIGS. 1-3, illustrating the plug fully inserted into the plug receptacle and the bracket support fully secured around the cable.

FIGS. 4 and 5 are schematic views illustrating operation of the cable connection system of FIGS. 1-3, specifically illustrating the cable 104 prior to or during (FIG. 4) and after installation (FIG. 5) at the quick connection point 58 of the turbine support component 40 and/or the control system 16. FIG. 4 is an exploded schematic side view of an embodiment of a plug receptacle 180 of a cable interface 182 (e.g., interface 114, 118) and a plug 184 (e.g., plug 120, 122) of the cable 104 shown in FIGS. 2 and 3, wherein the plug 184 is in the process of installation into the plug receptacle 180 at the quick connection point 58. In the illustrated embodiment, the quick connection point 58 includes a support structure 185 having a support bracket assembly 186 with first and second support brackets 188 and 190 (e.g., curved or C-shaped brackets) partially disposed around the cable 104 adjacent the plug in receptacle coupling 59. Prior to securing the cable 104 with the support bracket assembly 186, the plug receptacle 180 and the plug 184 may be connected in an axial direction 192 to form the quick connection point 58. For example, the cable interface 182 and the plug 184 may have mating male and female connectors (e.g., pins that fit into receptacles) that slidingly engage one another in the axial direction 192.

Prior to and during the sliding engagement, the cable interface 182 and the plug 184 may be aligned in the proper orientation via a connection key and alignment guide assembly 194 having one or more alignment guides or keys 196 inside or adjacent the cable interface 182 (e.g., interface 114, 118) and one or more alignment guides or keys 198 along or adjacent the plug 184 (e.g., plug 120, 122). For example, the alignment guides 196 may include 1, 2, 3, 4, 5, or more female alignment guides that mate with corresponding male alignment guides 198, or the alignment guides 196 may include 1, 2, 3, 4, 5, or more male alignment guides that mate with corresponding female alignment guides 198, or a combination thereof. The alignment guides 196, 198 may be oriented in the axial direction 192, and may include one or more axial protrusions that fit into axial slots (e.g., keys that fit into keyways). In certain embodiments, the cable interfaces 182 (e.g., interfaces 114, 118) and the plugs 184 (e.g., plugs 120, 122) for each cable 104 connection between a turbine support component 40 and the control system 16 may have a different number, size, and/or configuration of the alignment guides 196, 198, thereby defining a unique pattern or key of the connection key and alignment guide assembly 194. In this manner, the unique pattern or key of the assembly 194 may block incorrect installation of cables 104 between the support components 40 and the control system 16. The unique pattern or key also may include, or be supplemented with, unique color coding, symbols, numbering, codes, or other visual keys to facilitate rapid connection of the cables 104.

Prior to, during, or after the sliding engagement, the cable interface 182 and the plug 184 may be mechanically secured or interlocked together via a lock assembly 200 having a set of mating lock features 202 between the cable interface 182 (e.g., interface 114, 118) and the plug 184 (e.g., plug 120, 122). The set of mating lock features 202 may include one or more first couplings or locks 204 at or adjacent the cable interface 182 (e.g., interface 114, 118) that interlock with one or more second couplings or locks 206 at or adjacent the plug 184 (e.g., plug 120, 122). The set of mating lock features 202 (e.g., 204, 206) may include mating threaded couplings, snap-fit couplings, hook in slot latches, spring-loaded ring in groove couplings, or any combination thereof. Thus, once the plug 184 is inserted into the cable interface 182, the mating lock features 202 are engaged to block removal of the plug 184 from the cable interface 182, and the support bracket assembly 186 is fully assembled to secure the cable 204.

FIG. 5 is a schematic side view of an embodiment of the plug receptacle 180 of the cable interface 182 (e.g., interface 114, 118) and the plug 184 (e.g., plug 120, 122) of the cable 104 shown in FIGS. 2-4, wherein the plug 184 is in fully installed into the plug receptacle 180, the lock assembly 200 is fully secured, and the bracket assembly 186 is fully assembled at the quick connection point 58. When the cable is installed between the turbine support component 40 and the control system 16 (e.g., motor control system 140, each of the cable interfaces 182 (e.g., interface 114, 118) and the plugs 184 (e.g., plug 120, 122) may include the features described with reference to FIGS. 4 and 5, and thus these features may be described as first and second ones of these features.

The support structure 185 and support bracket assembly 186 are configured to support and stabilize the cable 104 and the plug in receptacle coupling 59 between the plug 184 (e.g., plug 120, 122) and the cable interface 182 (e.g., interface 114, 118). The support structure 185 and support bracket assembly 186 may be coupled to a wall, a rail, or structure 210 of the mobile turbine system 10 at a location near the first quick connection point 58, e.g., a wall of the turbine support component 40 and/or the connect panel 116 of the control system 16. The illustrated support bracket assembly 186 includes one pair of brackets 188, 190, although the support bracket assembly 186 may include 1, 2, 3, 4, 5, or more pairs of brackets 188, 190. Each pair of brackets 188, 190 may be coupled together with fasteners 212, such as threaded fasteners, latches, snap-fit couplings, hook in slot latches, or any combination thereof. The brackets 188, 190 may include first and second curved or C-shaped brackets, clamps, or braces. In some embodiments, the support structure 185 and/or the support bracket assembly 186 may include a support strap, such as a fabric, metal, or elastomeric strap that is wrapped around and secured about the cable 204.

Figure 6:
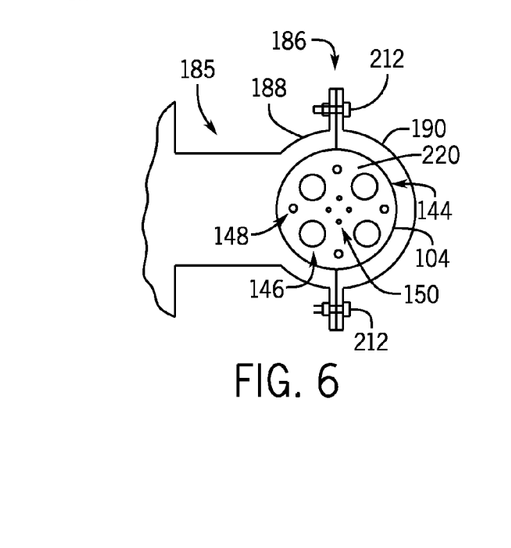
FIG. 6 is a cross-sectional view of an embodiment of the cable of FIG. 5 taken along line 6-6.

FIG. 6 is a cross-sectional view of an embodiment of the cable 104 of FIGS. 1-5, taken along line 6-6 of FIG. 5, illustrating the cable 104 supported by the bracket assembly 186, and illustrating the plurality of conductors 144 insulated from one another by insulating material 220 inside the cable 104. The insulating material 220 may include, but is not limited to, non-conducting materials such as elastomers, polymers, fabrics, ceramics, and/or composite materials to insulate the conductors 144. The plurality of conductors 144 inside the cable 104 may include the set of motor conductors 146 (or other conductors), the set of auxiliary conductors 148 (or other conductors), and the set of sensor conductors 150 (or other conductors). In certain embodiments, the set of auxiliary conductors 148 may include all or part of the set of sensor conductors 150. The conductors 144 may be sized and rated the same or different from one another. For example, the set of motor conductors 146 have a first size and voltage rating, the set of auxiliary conductors 148 have a second size and voltage rating, and the set of sensor conductors 150 have a third size and voltage rating. The first size and voltage rating may be greater than both the second and third sizes and ratings, while the second size and voltage rating may be greater than the first size and voltage rating. For example, the second size and voltage rating may be less than or equal to approximately 10 to 75, 15 to 50, or 20 to 30 percent of the first size and voltage rating. By further example, the third size and voltage rating may be less than or equal to approximately 1 to 20, 2 to 15, or 3 to 10 percent of the first size and voltage rating. By further example, the third size and voltage rating may be less than or equal to approximately 10 to 75, 15 to 50, or 20 to 30 percent of the second size and voltage rating. The number in each set of conductors 144 (e.g., 146, 148, and 150) also may vary, but may include 1, 2, 3, 4, 5, 6, 7, 8, 9, or 10 conductors per set. For example, the set of motor conductors 146 may include a single set of conductors for a particular motor 80, such as only one conductor for each phase of an N-phase motor (e.g., only one conductor for a first phase, only one conductor for a second phase, and only one conductor for a third phase of a three-phase motor) and a ground conductor. In some embodiments, the set of motor conductors 146 may include a plurality of sets of motor conductors 146 for different motors, e.g., a first set of motor conductors 146 for a first motor 80 and a second set of motor conductors 146 for a second motor 80 at a particular turbine support component 40. The set of auxiliary conductors 148 may include DC and/or AC conductors, and may have a similar arrangement of N-phase conductors for auxiliary equipment (e.g., first, second, and third phase conductors and ground conductor of a three-phase electrical component). The set of sensor conductors 150 may include one or more sensor conductors for each type of sensor, each individual sensor, or each group of sensors. Similar to the size, rating, and number of conductors 144 (e.g., 146, 148, and 150), the first and second sets of motor connectors 152, 158, the first and second sets of auxiliary connectors 154, 160, and the first and second sets of sensor connectors 156, 162 may vary in size, rating, and number.

Figure 7:
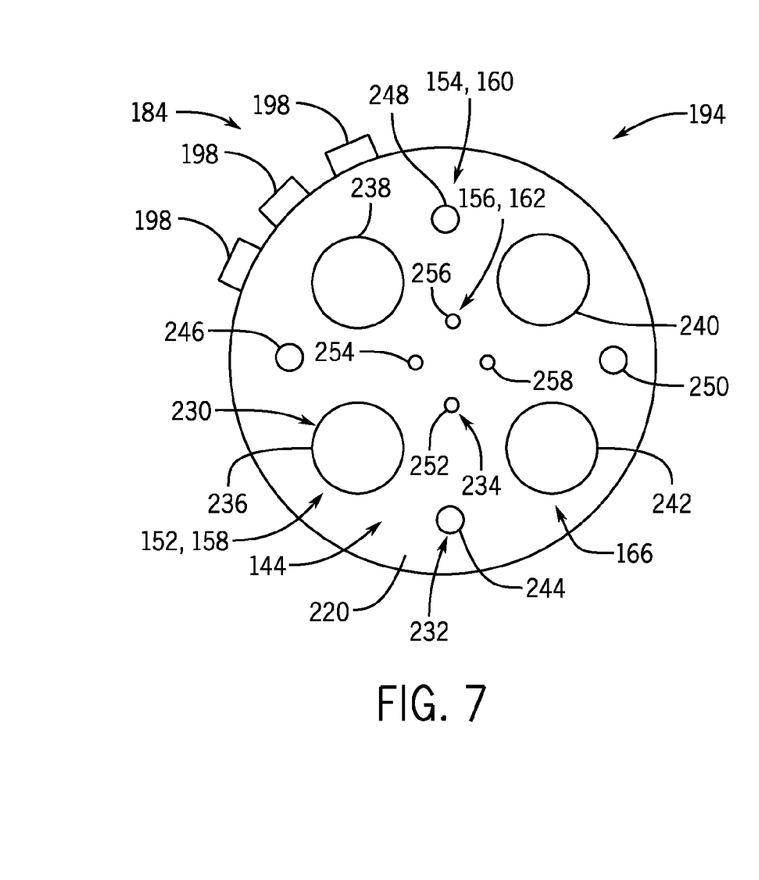
FIG. 7 is an end view of an embodiment of the plug of FIG. 4 taken along line 7-7, showing alignment guides disposed along the plug.

FIG. 7 is an end view of an embodiment of the plug 184 (e.g., plug 120, 122) of FIGS. 2-5, taken along line 7-7 of FIG. 4, illustrating details of the second alignment guides 198 of the connection key and alignment guide assembly 194 and the plug connectors 166 of the sets of mating motor connectors 152, 158, the sets of mating auxiliary connectors 154, 160, and the sets of mating sensor connectors 156, 162. In the illustrated embodiment, the plug connectors 166 of the plug 184 (e.g., plug 120, 122) include a set of motor connectors 230, a set of auxiliary connectors 232, and a set of sensor connectors 234). Similar to the size, rating, and number of conductors 144 (e.g., 146, 148, and 150), the set of motor connectors 230, the set of auxiliary connectors 232, and the set of sensor connectors 234 may vary in size, rating, and number. For example, the set of motor connectors 230 may include motor connectors 236, 238, 240, and 242, the set of auxiliary connectors 232 may include auxiliary connectors 244, 246, 248, and 250, and the set of sensor connectors 234 may include sensor connectors 252, 254, 256, and 258. These connectors may correspond to various voltages, AC, DC, data communications and control, power, or any combination thereof.

For example, the set of motor connectors 230 have a first size and voltage rating, the set of auxiliary connectors 232 have a second size and voltage rating, and the set of sensor connectors 234 have a third size and voltage rating. The first size and voltage rating may be greater than both the second and third sizes and ratings, while the second size and voltage rating may be greater than the first size and voltage rating. For example, the second size and voltage rating may be less than or equal to approximately 10 to 75, 15 to 50, or 20 to 30 percent of the first size and voltage rating. By further example, the third size and voltage rating may be less than or equal to approximately 1 to 20, 2 to 15, or 3 to 10 percent of the first size and voltage rating. By further example, the third size and voltage rating may be less than or equal to approximately 10 to 75, 15 to 50, or 20 to 30 percent of the second size and voltage rating. The number in each set of plug connectors 164 (e.g., 230, 232, and 234) also may vary, but may include 1, 2, 3, 4, 5, 6, 7, 8, 9, or 10 connectors per set. For example, the set of motor connectors 230 may include a single set of connectors for a particular motor 80, such as only one connector for each phase of an N-phase motor (e.g., only one connector for a first phase, only one connector for a second phase, and only one connector for a third phase of a three-phase motor) and a ground connector. In some embodiments, the set of motor connectors 230 may include a plurality of sets of motor connectors 230 for different motors, e.g., a first set of motor connectors 230 for a first motor 80 and a second set of motor connectors 230 for a second motor 80 at a particular turbine support component 40. The set of auxiliary connectors 232 may include DC and/or AC connectors, and may have a similar arrangement of N-phase connectors for auxiliary equipment (e.g., first, second, and third phase connectors and ground connector of a three-phase electrical component). The set of sensor connectors 234 may include one or more sensor connectors for each type of sensor, each individual sensor, or each group of sensors.

In the illustrated embodiment, the connection key and alignment guide assembly 194 includes a group of three equally spaced and equally sized alignment guides 198. These alignment guides 198 protrude from the plug 184 (e.g., plug 120, 122) and extend in the axial direction 192 as shown in FIG. 4. As discussed above, the alignment guides 198 may be disposed in a variety of numbers, sizes, spacings (e.g., equal or varying), and arrangements to define a unique connection key, which may ensure that the plug 184 (e.g., plug 120, 122) cannot be inadvertently installed into an incorrect cable interface 182 (e.g., interface 114, 118).

Figure 8:
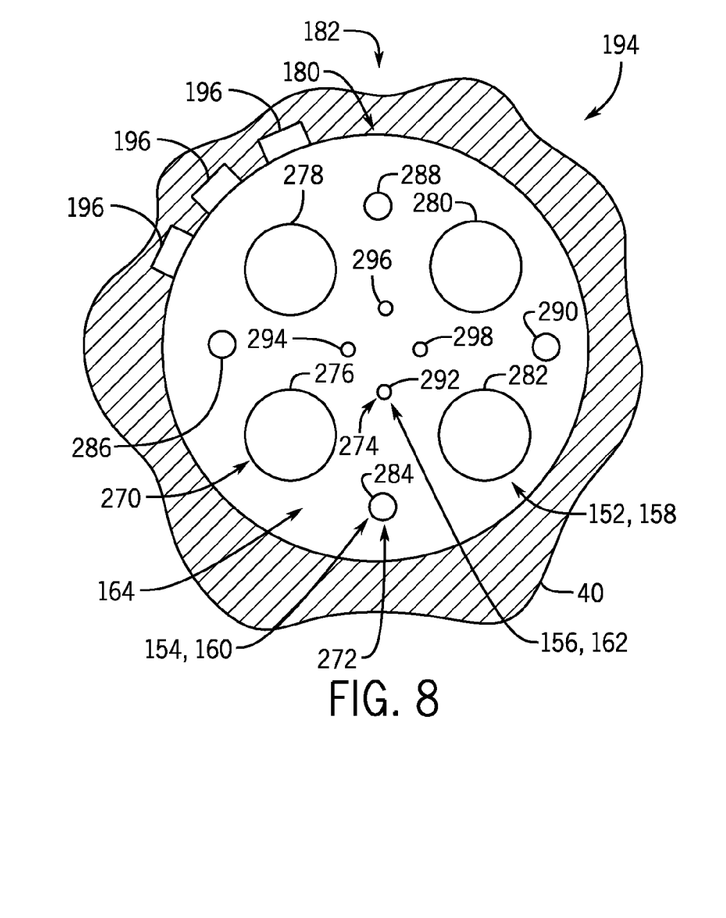
FIG. 8 is an end view of an embodiment of the plug receptacle of FIG. 4 taken along line 7-7, showing alignment guides along the plug receptacles.

FIG. 8 is an end view of an embodiment of the plug receptacle 180 of the cable interface 182 (e.g., interface 114, 118) of FIGS. 2-5, taken along line 8-8 of FIG. 4, illustrating details of the first alignment guides 196 of the connection key and alignment guide assembly 194 and the interface connectors 164 of the sets of mating motor connectors 152, 158, the sets of mating auxiliary connectors 154, 160, and the sets of mating sensor connectors 156, 162. The arrangement of FIG. 8 is substantially the same as the arrangement of the plug 184 shown in FIG. 7. In the illustrated embodiment, the interface connectors 164 of the plug receptacle 180 of the cable interface 182 (e.g., interface 114, 118) include a set of motor connectors 270, a set of auxiliary connectors 272, and a set of sensor connectors 274). Similar to the size, rating, and number of conductors 144 (e.g., 146, 148, and 150) of FIG. 6 and the plug connectors 166 of FIG. 7, the set of motor connectors 270, the set of auxiliary connectors 272, and the set of sensor connectors 274 may vary in size, rating, and number. For example, the set of motor connectors 270 may include motor connectors 276, 278, 280, and 282, the set of auxiliary connectors 272 may include auxiliary connectors 284, 286, 288, and 290, and the set of sensor connectors 274 may include sensor connectors 292, 294, 296, and 298. These connectors may correspond to various voltages, AC, DC, data communications and control, power, or any combination thereof, and generally match those of the conductors 144 (e.g., 146, 148, and 150) of FIG. 6 and the plug connectors 166 of FIG. 7 for a particular cable connection with a turbine support component 40.

For example, the set of motor connectors 270 have a first size and voltage rating, the set of auxiliary connectors 272 have a second size and voltage rating, and the set of sensor connectors 274 have a third size and voltage rating. The first size and voltage rating may be greater than both the second and third sizes and ratings, while the second size and voltage rating may be greater than the first size and voltage rating. For example, the second size and voltage rating may be less than or equal to approximately 10 to 75, 15 to 50, or 20 to 30 percent of the first size and voltage rating. By further example, the third size and voltage rating may be less than or equal to approximately 1 to 20, 2 to 15, or 3 to 10 percent of the first size and voltage rating. By further example, the third size and voltage rating may be less than or equal to approximately 10 to 75, 15 to 50, or 20 to 30 percent of the second size and voltage rating. The number in each set of interface connectors 164 (e.g., 270, 272, and 274) also may vary, but may include 1, 2, 3, 4, 5, 6, 7, 8, 9, or 10 connectors per set. For example, the set of motor connectors 270 may include a single set of connectors for a particular motor 80, such as only one connector for each phase of an N-phase motor (e.g., only one connector for a first phase, only one connector for a second phase, and only one connector for a third phase of a three-phase motor) and a ground connector.

In some embodiments, the set of motor connectors 270 may include a plurality of sets of motor connectors 270 for different motors, e.g., a first set of motor connectors 270 for a first motor 80 and a second set of motor connectors 270 for a second motor 80 at a particular turbine support component 40. The set of auxiliary connectors 272 may include DC and/or AC connectors, and may have a similar arrangement of N-phase connector for auxiliary equipment (e.g., first, second, and third phase connectors and ground connector of a three-phase electrical component). The set of sensor connectors 274 may include one or more sensor connectors for each type of sensor, each individual sensor, or each group of sensors.

In the illustrated embodiment, the connection key and alignment guide assembly 194 includes a group of three equally spaced and equally sized alignment guides 196. These alignment guides 196 are recessed into the plug receptacle 180 of the cable interface 182 (e.g., interface 114, 118) and extend in the axial direction 192 as shown in FIG. 4. As discussed above, the alignment guides 196 may be disposed in a variety of numbers, sizes, spacings (e.g., equal or varying), and arrangements to define a unique connection key, which may ensure that the plug receptacle 180 of the cable interface 182 (e.g., interface 114, 118) cannot inadvertently receive an incorrect plug 184 (e.g., plug 120, 122).

Technical effects of the invention include a system for a quick disconnect cable disposed between a turbine support system and a motor control system having one or more cable interfaces. The quick disconnect cable may prevent mismatched wiring connections by utilizing fewer cables for the motor driven machines and may also reduce the weight associated with a greater number of cables. The cable may surround a plurality of conductors that are insulated from one another. The cable may have a first plug which removably couples with a first cable interface and a second plug which removably couples with a second cable interface. The first plug and the first cable interface may include a first set of mating motor connectors and a first set of mating auxiliary connectors, and the second plug and the second cable interface may include a second set of mating motor connectors and a second set of mating auxiliary connectors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbine having one or more turbine stages;
   a turbine support system, comprising:
      a turbine support component configured to support operation of the turbine;
      a motor coupled to the turbine support component, wherein the motor is configured to drive the turbine support component;
      an auxiliary component comprising a motor support component configured to support operation of the motor; and
      a first cable interface coupled to the motor and the auxiliary component;

a motor control system, comprising:
   a controller;
   a power source coupled to the controller; and
   a second cable interface coupled to the power source; and
a cable having a first plug removably coupled to the first cable interface and a second plug removably coupled to the second cable interface, wherein the cable comprises a plurality of conductors that are insulated from one another, the first plug and the first cable interface comprise a first set of mating motor connectors and a first set of mating auxiliary connectors, and the second plug and the second cable interface comprise a second set of mating motor connectors and a second set of mating auxiliary connectors.

2. The system of claim 1, comprising a mobile turbine system having the turbine, the turbine support system, the motor control system, and the cable.

3. The system of claim 1, comprising an electrical generator driven by the turbine.

4. The system of claim 1, wherein the turbine comprises a gas turbine engine having a compressor, a combustor, and the one or more turbine stages.

5. The system of claim 1, wherein the turbine support component comprises a cooling system, a fan, a fuel system, a pump, or a combination thereof, configured to support operation of the turbine.

6. The system of claim 1, wherein the motor support component of the auxiliary component comprises a heating system, a monitoring system, a sensor, or a combination thereof, configured to support operation of the motor.

7. The system of claim 1, wherein the motor comprises an alternating current (AC) motor, the first set of mating motor connectors comprises a first set of mating three-phase connectors, and the second set of mating motor connectors comprises a second set of mating three-phase connectors, wherein each of the first and second sets of mating three-phase connectors has only one mating pair of first phase connectors, only one mating pair of second phase connectors, and only one mating pair of third phase connectors.

8. The system of claim 1, wherein the first and second sets of mating motor connectors are high voltage connectors, and the first and second sets of mating auxiliary connectors are low voltage connectors.

9. The system of claim 1, wherein the first and second sets of mating motor connectors and the first and second sets of mating auxiliary connectors comprise mating male and female connectors that slidingly engage one another in an axial direction.

10. The system of claim 1, wherein the first plug is selectively locked to the first cable interface with a first set of mating lock features, and the second plug is selectively locked to the second cable interface with a second set of mating lock features.

11. The system of claim 1, wherein the turbine support system comprises a sensor, the first cable interface is coupled to the sensor, the first plug and the first cable interface comprise a first set of mating sensor connectors, and the second plug and the second cable interface comprise a second set of mating sensor connectors.

12. The system of claim 11, wherein the sensor is configured to monitor one or more parameters of the turbine support system.

13. The system of claim 11, wherein the cable has a first set of conductors extending between the first and second sets of mating motor connectors, a second set of conductors extending between the first and second sets of mating auxiliary connectors, and a third set of conductors extending between the first and second sets of mating sensor connectors.

14. A system, comprising:
a turbine support system, comprising:
   a turbine support component configured to support operation of a turbine;
   a motor coupled to the turbine support component, wherein the motor is configured to drive the turbine support component;
   an auxiliary component comprising a motor support component configured to support operation of the motor; and
   a first cable interface coupled to the motor and the auxiliary component, wherein the first cable interface is configured to removably couple with a first plug of a cable, and the first plug and the first cable interface comprise a first set of mating motor connectors and a first set of mating auxiliary connectors.

15. The system of claim 14, comprising the cable having the first plug, a second plug, and a plurality of conductors that are insulated from one another.

16. The system of claim 14, comprising a motor control system having a controller, a power source coupled to the controller, and a second cable interface coupled to the power source, wherein the second cable interface is configured to removably couple with a second plug of the cable, and the second plug and the second cable interface comprise a second set of mating motor connectors and a second set of mating auxiliary connectors.

17. The system of claim 14, wherein the turbine support system comprises a sensor, the first cable interface is coupled to the sensor, the first plug and the first cable interface comprise a first set of mating sensor connectors.

18. A system, comprising:
a cable having a first plug configured to removably couple to a first cable interface of a turbine support system and a second plug configured to removably couple to a second cable interface of a motor control system, wherein the cable comprises a plurality of conductors that are insulated from one another, the first plug and the first cable interface comprise a first set of mating motor connectors and a first set of mating auxiliary connectors, the second plug and the second cable interface comprise a second set of mating motor connectors and a second set of mating auxiliary connectors, the plurality of conductors comprise a first set of one or more motor conductors extending between the first and second plugs and configured to support a motor that drives a turbine support component of the turbine support system, the plurality of conductors comprise a second set of one or more auxiliary conductors extending between the first and second plugs and configured to support an auxiliary component that supports operation of the motor of the turbine support system.

19. The system of claim 18, comprising at least one of:
the turbine support system comprising a turbine support component, a motor coupled to the turbine support component, an auxiliary component, and the first cable interface coupled to the motor and the auxiliary component; or
the motor control system comprising a controller, a power source coupled to the controller, and the second cable interface coupled to the power source.

20. The system of claim 18, wherein the first plug and the first cable interface comprise a first set of mating sensor connectors, and the second plug and the second cable interface comprise a second set of mating sensor connectors, the plurality of conductors comprise a third set of one or more sensor conductors extending between the first and second plugs and configured to support a sensor.

* * * * *